Feb. 9, 1971
C. FYFE
3,561,835
ROTARY DRIVE ELECTRICAL PULSE GENERATOR
Filed March 24, 1969
3 Sheets-Sheet 1
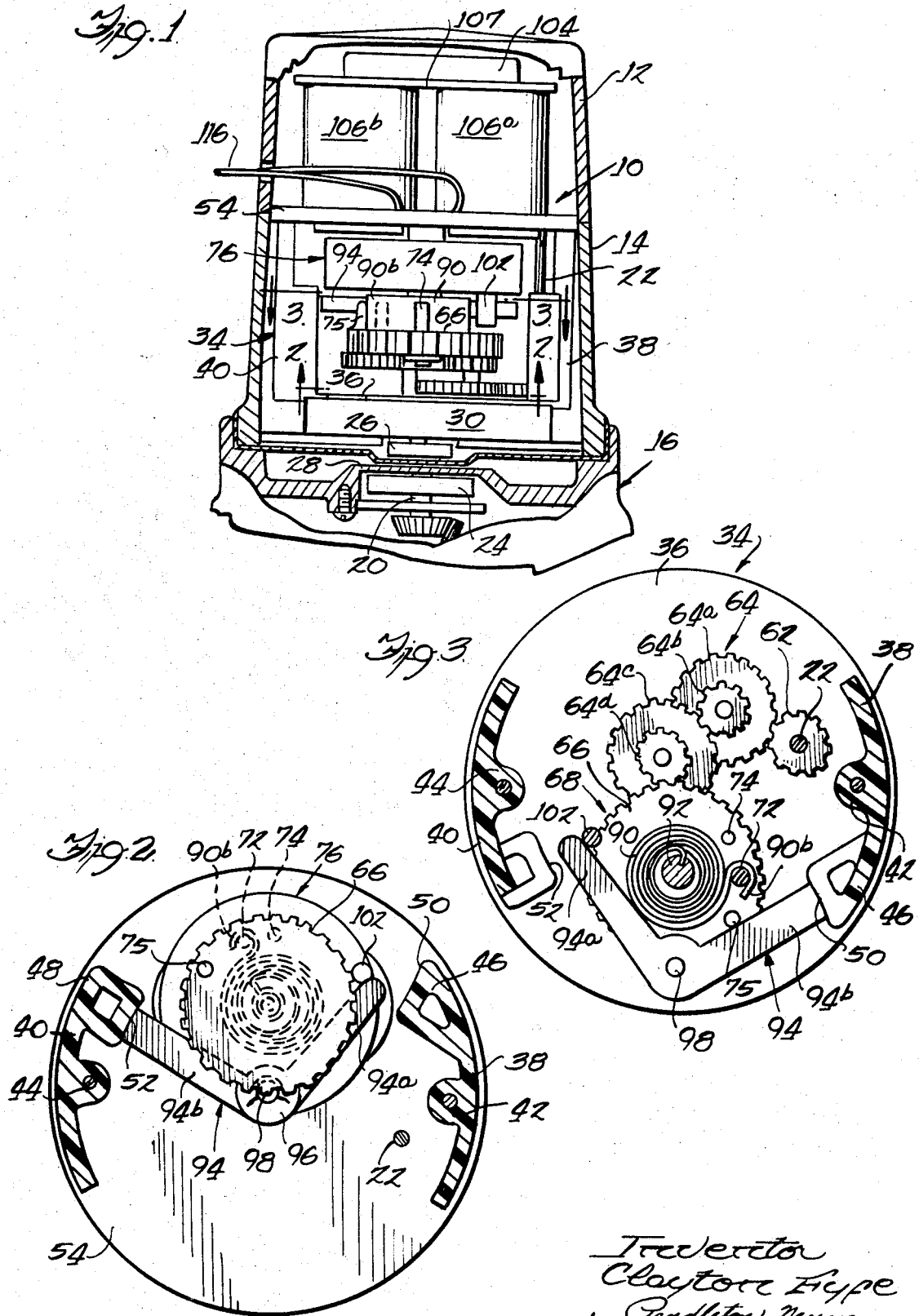

Feb. 9, 1971          C. FYFE          3,561,835
ROTARY DRIVE ELECTRICAL PULSE GENERATOR
Filed March 24, 1969          3 Sheets-Sheet 2
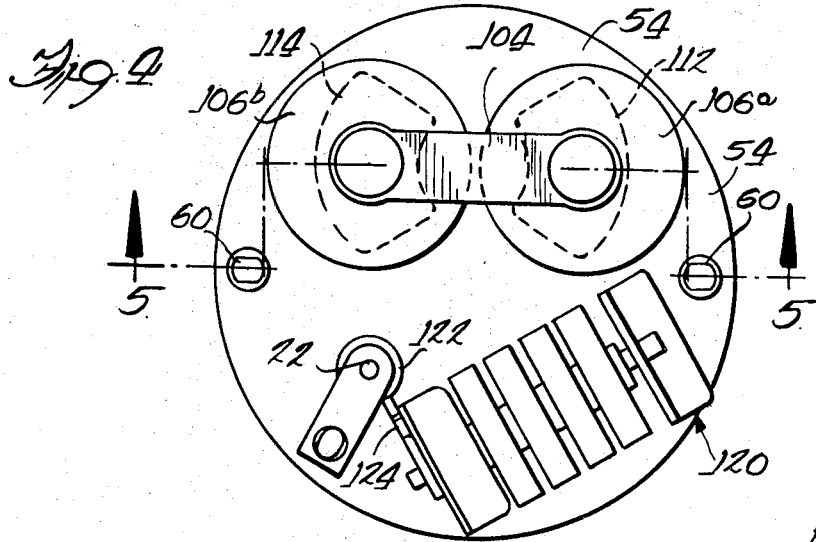
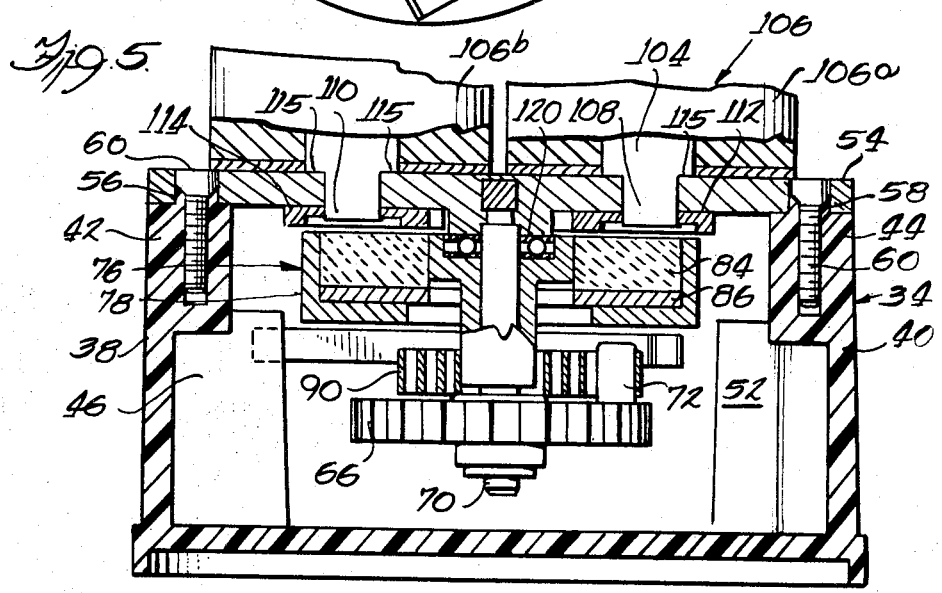
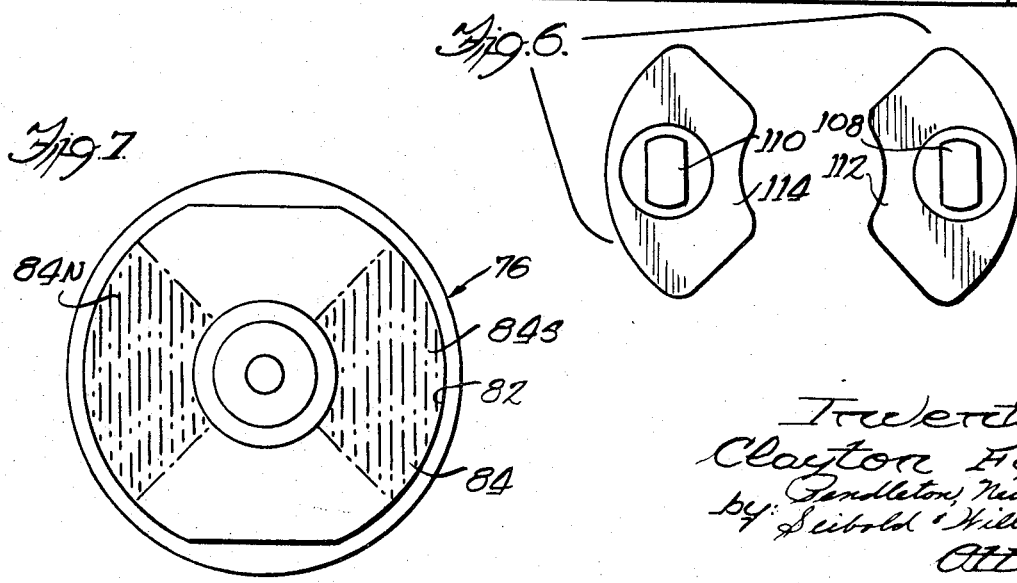
Inventor
Clayton Fyfe
by Pendleton, Neuman,
Seibold & Williams
Atty's Feb. 9, 1971 C. FYFE 3,561,835
ROTARY DRIVE ELECTRICAL PULSE GENERATOR
Filed March 24, 1969 3 Sheets-Sheet 3
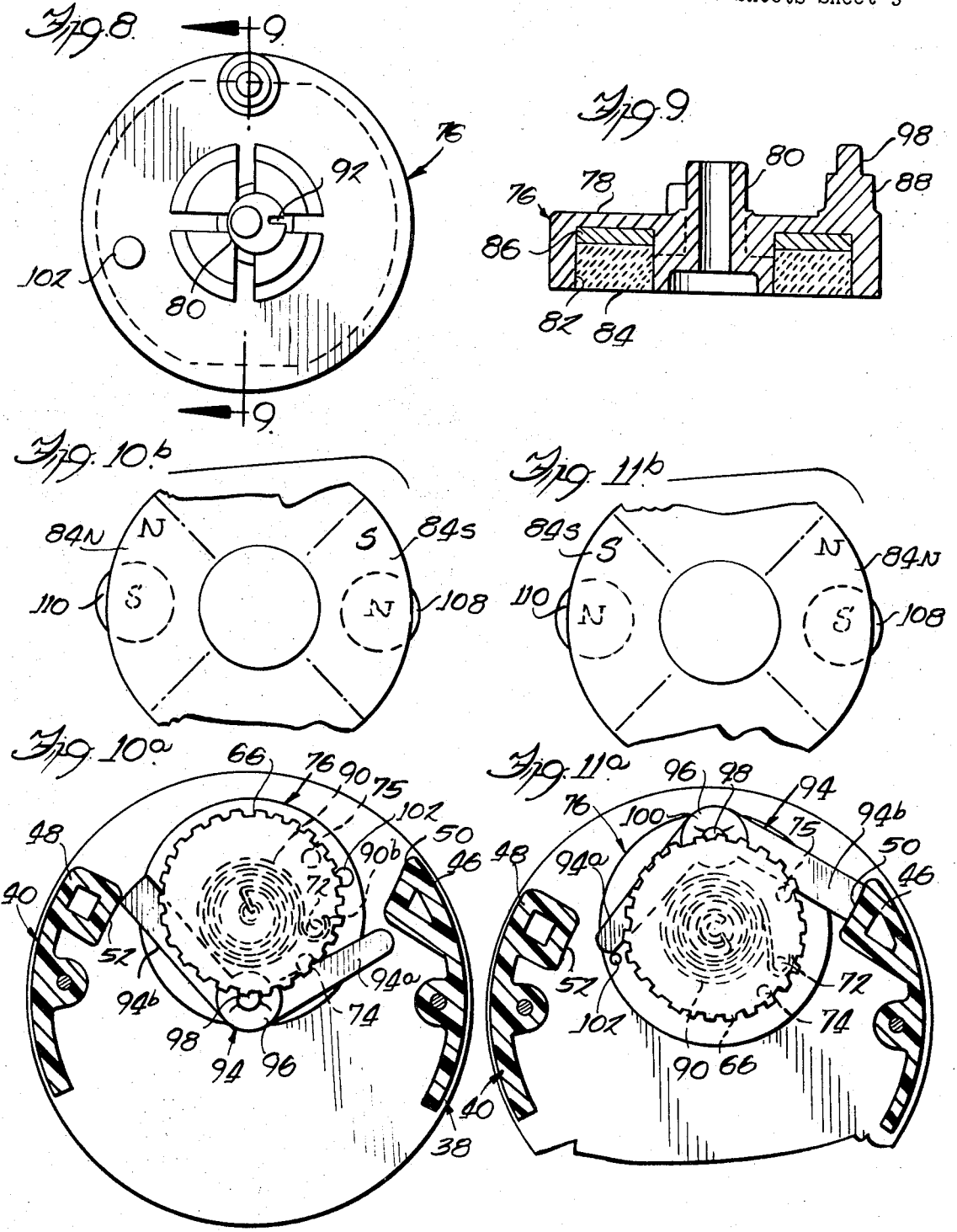
Inventor
Clayton Fyfe
by Pendleton, Neuman,
Seibold William
Atty's United States Patent Office 3,561,835
Patented Feb. 9, 1971

1

3,561,835
ROTARY DRIVE ELECTRICAL PULSE
GENERATOR
Clayton Fyfe, Milwaukee, Wis., assignor to Badger Meter
Manufacturing Company, Milwaukee, Wis., a corporation of Wisconsin
Filed Mar. 24, 1969, Ser. No. 809,910
Int. Cl. H02k 7/00
U.S. Cl. 310—66                                16 Claims

ABSTRACT OF THE DISCLOSURE

An electromechanical transducer adapted to utilize a mechanical rotary input drive from a metering device and to generate a digital electrical pulse output for sensing or reading at a station remote from the meter. The rotary input drives a gear which is connected by a coil spring to a coaxially disposed rotatable magnet assembly. A trigger mechanism sequentially restrains the magnet assembly to cause loading of the coil spring upon rotation of the gear, and thereafter releases the magnet assembly for intermittent, limited rotation in the direction of rotation of the gear under the impetus of the coil spring. A U-shaped core with coils thereon is positioned with the ends of the core adjacent the magnet assembly for generating an electrical pulse upon each such rotation of the magnet assembly.

This invention relates to electromechanical transducers, and particularly to electrical pulse generators utilizing a rotary mechanical input, as from a fluid metering device, and providing a digital electrical output for sensing at a remote station.

Apparatus has heretofore been proposed for converting the energy of a driven rotary member, such as an output spindle of a fluid meter, to electrical pulses for providing an indication of the quantity of fluid metered at a station remote from the metering mechanism. One type of such apparatus which has been utilized commercially is disclosed in U.S. Pat. No. 3,118,075.

It is an object of this invention to provide improvements in electromechanical transducers.

It is another object of this invention to provide an improved electrical pulse generator which avoids any requirement for critical points of intermittent engagement or release of a component or critical positioning or repositioning between components of the drive system.

It is another object of this invention to provide an improved electrical pulse generator which provides an optimum useable output signal consistent with limited mechanical input, and which minimizes or eliminates deleterious signal components.

It is a further object of this invention to provide an improved electrical pulse generator utilizing a rotary drive which rotates unidirectionally throughout the operation of the device.

It is another object of this invention to provide an improved pulse generator of the indicated type having a positive action and high reliability, and which avoids the effect of residual magnetism in the driven magnetic system.

It is a further object of this invention to provide an improved pulse generator of the indicated type which is simple in construction, utilizing a minimum number of parts, and which may be economically produced.

Additional objects of this invention are to provide a pulse generator of the indicated type which is more efficient than apparatus heretofore provided for the same purpose, and which may be operated with a lower torque input, while providing a stronger output signal pulse at a sufficiently high repetition rate to provide good resolution of the measured quantity.

Further and additional objects and advantages will appear from the description, accompanying drawings and appended claims.

In carrying out this invention in one illustrative form, an electromechanical transducer is provided which utilizes a rotary mechanical drive input, as from a fluid metering device, to provide electrical pulses as a digital measurement of the input. The input drives a rotary drive member disposed in coaxial alignment with a rotary magnet member. These rotary members are connected to one another by a resilient element which permits relative rotation therebetween by imposition of elastic strain upon the resilient element. A trigger carried by the rotatable magnet member sequentially engages fixed, angularly spaced stop abutments to preclude rotation of the magnet member as the resilient element is loaded by rotation of the drive member. An element carried by the drive member trips said trigger after predetermined rotation of said drive member to permit quick rotation of the magnet member in the direction of rotation of the drive member, under the impetus of the recovery force of the resilient element, as said trigger moves from one such stop abutment to the next stop abutment. A core and coil assembly is disposed with the core ends in opposition to positions assumed by the magnetic poles of said magnet member, whereby each such rotation of said magnet member generates an electrical pulse in said coil.

For a more complete understanding of this invention, reference should now be had to the embodiment illustrated in the accompanying drawings and described below by way of an example of the invention.

In the drawings, FIG. 1 is a side view of a portion of a metering apparatus, partially broken away, and illustrating an electromechanical transducer thereon employing teachings of this invention;

FIG. 2 is a bottom view of the ballistic trigger mechanism of the apparatus of FIG. 1, i.e., taken along line 2—2 of FIG. 1 and looking in the direction of the arrows, with the input drive gearing omitted;

FIG. 3 is a sectional view taken along line 3—3 of FIG. 1 and looking in the direction of the arrows, with the trigger mechanism in changed position;

FIG. 4 is a top view of the generator apparatus of FIG. 1;

FIG. 5 is a cross-sectional view taken along the irregular line 5—5 of FIG. 4 and looking in the direction of the arrows;

FIG. 6 is a bottom view of the pole faces of the apparatus of FIG. 1;

FIG. 7 is a top view of the magnet assembly of the apparatus of FIG. 1;

FIG. 8 is a bottom view of the magnet assembly of FIG. 7;

FIG. 9 is a cross-sectional view taken along line 9—9 of FIG. 8 and looking in the direction of the arrows;

FIGS. 10a and 11a are partial views, similar to FIG. 2, illustrating the trigger mechanism in changed positions, and FIGS. 10b and 11b are illustrations of the corresponding arrangements of the magnet and field pole components.

Referring first to FIG. 1, an electromechanical transducer 10 is enclosed in a housing 12–14 mounted atop a fluid metering device 16. The transducer 10 is adapted to generate electrical pulses as a digital indication of the fluid flow measured by the meter. More specifically, the transducer 10 utilizes energy from a rotating mechanical output of the meter to generate the electrical pulses. These pulses may be sensed by appropriate means (not shown) at an adjacent or remote station to register the quantity of fluid flow through the meter.

The metering device 16 may be of any appropriate type, either positive displacement, such as a nutating disk unit as shown or an oscillating piston unit, or an inferential type, as with a rotary impeller, and includes a rotary output shaft 20 which is driven in direct proportion to the quantity of fluid metered.

The transducer 10 includes a rotary input shaft 22 which is suitably driven in response to the rotation of meter output shaft 20. The drive relation between shafts 20 and 22 may be varied in accordance with each particular application, and will depend upon factors such as the type of meter device being utilized and the read-out resolution required. The illustrated drive arrangement includes a magnetic coupling between maget rotors 24 and 26 through an intervening wall 28 (e.g., as disclosed in U.S. Pat. No. 3,248,583), with rotor 26 driving a reduction gear train, indicated at 30, the output of which comprises shaft 22. By way of further specific examples, the gear train 30 and/or the magnetic coupling may be eliminated, and a direct drive may be utilized, as by shaft 22 being an extension of shaft 20 through an appropriate packing gland in wall 28.

Referring now also to FIGS. 2 and 3, the transducer 10 comprises a base frame member 34 which includes a base plate portion 36 and two side support portions 38 and 40, the latter including mounting post sections 42 and 44 as well as stop portions 46 and 48 providing abutment surfaces 50 and 52. The base frame may be cast or molded, or otherwise fabricated, a convenient and relatively inexpensive example being a molding of a plastic material such as an acetal. The upstanding stop portions providing abutment surfaces 50 and 52 may be hollow as illustrated, or otherwise of reduced cross-section, to provide some resilience for absorbing the impact of the trigger mechanism, described below. A top frame plate 54 is positioned atop side support portions 38 and 40, being positioned by suitable openings therein fitting over bosses 56 and 58, and being secured thereon by screws 60 extending into support post portions 42 and 44, see FIG. 5.

The input drive shaft 22 is journaled in base plate portion 36 and top frame plate 54. Shaft 22 carries a spur gear 62 for driving a reduction gear train 64 comprising gears 64a, 64b, 64c and 64d (FIG. 2). Gear 64d meshes with the drive gear 66 of an intermittent drive mechanism indicated generally at 68.

Referring to FIGS. 2, 3 and 5, gear 66 is rotatably journaled on a stud shaft 70 which is supported in top frame plate 54 (see FIG. 5). Gear 66 carries three upwardly projecting pins 72, 74 and 75, for purposes to be described below. These pins may be integral with the gear, as by providing the gear and pins as a molded plastic unit, or may be separate elements mounted in the gear member, as by a press fit. Also journaled on shaft 70, above gear 66, is a magnet rotor assembly 76.

Referring also to FIGS. 7, 8 and 9, the magnet rotor assembly 76 includes a casing 78 which includes a center collar portion 80 by which the assembly 76 is journaled on shaft 70. The casing is formed with an annular recess 82 which receives a flat annular, washer-shaped, ceramic permanent magnet rotor element 84. An annular steel plate 86 is also disposed in recess 82, beneath magnet 84, to provide a low reluctance flux path backup component for the magnet, thereby to enhance the functioning of the magnet. As illustrated in FIG. 7, the recess 82 and the magnet 84 are provided with matched chordal key portions to prevent relative rotation between these components and to provide means for locating the poles of the magnet, when the magnet is premagnetized, and thus to establish the relationship of the poles with respect to the escape trigger mechanism. The magnet 84 is permanently magnetized in two areas, as indicated by the shaded portions in FIG. 7, with a magnetizing pattern to provide a north pole at the upper surface in one magnetized area 84N and a south pole at the upper surface in the other magnetized area 84S. The housing 76 is also formed with a depending boss 88 near its periphery.

As best seen in FIGS. 3 and 5, a flat coil spring 90, i.e. a flat wire spiral torsion spring, is disposed between the drive gear 66 and the housing 76, in axial alignment with both of these members. The inner end of the spring is engaged in a slot 92 in an eccentric, reinforcing portion of the collar 80 of housing 76 (see also FIG. 8). The opposite end of the spring 90 is formed into a hook, as at 90b, and engages the pin 72 which extends upward from gear 66.

A trigger element 94 is journaled on boss 88 of the casing 78 and is retained thereon, as by a suitable retaining washer 96 which engages a protruding stud portion 98. The trigger element 94 comprises a bell crank lever having arms 94a and 94b. The pin 75 on gear 66 extends into the path of arm 94b. When the trigger is tripped, as will be described further below, the arm 94b engages the pin 75 (see FIGS. 3 and 11a) whereby the trigger is positioned so that the distal end of arm 94b projects from the center of rotation of the magnet rotor assembly (the center axis of pin 70) a sufficient distance to engage abutment surfaces 50 and 52 (see also FIG. 2). In this position, arm 94a engages a stop pin 102 which extends from the underside of housing 78 to limit the positioning movement of trigger 94.

Other arrangements may be provided to bias arm 94b to its outward stop engaging position. For instance a protrusion may be provided on spring 90 to engage the arm 94a at a point remote from the pivot axis defined by the stud 98 to urge the trigger 94 in a counterclockwise direction (as seen in FIG. 2) when the spring 90 is expanded (unloaded) as in FIG. 11a, or a separate small biasing spring may be used, with one end of the spring being secured to stud 98 and the other end engaging arm 94a or arm 94b to urge arm 94b outward.

Referring to FIGS. 1 and 5, the pulse generator includes a U-shaped soft-iron core 104 having a coil 106 comprising coil portions 106a and 106b disposed about the two legs of the core, as illustrated. These coil portions are connected in series and comprise, in effect, a single coil. The coil bobbin or spool components on which coils 106a and 106b are wound conveniently may be molded as a single element, being joined by a flexible top connector section 107. Such spools then may be disposed in axial alignment for winding as one core, by flexing of section 107, and thereafter are returned to their side-by-side position for insertion of the U-shaped core 104.

The coil assembly comprising core or pole piece 104 and coil 106 is disposed symmetrically about the extended axis of rotation of the magnet rotor assembly, with the ends 108 and 110 of core 104 closely adjacent the plane of rotation of the upper surface of magnet 48. Sector shaped pole piece segments 112 and 114 (see FIG. 6) are staked on the pole ends 108 and 110 (see FIG. 5) and provide primarily a means of fastening the core and coil assembly to top frame plate 54. The double D shape of the pole ends provides shoulders at 115 which bear on frame plate 54 while segments 112 and 114 provide the fastening when staked. A secondary function of the pole piece segments 112 and 114 is to provide more efficient magnetic coupling between the permanent magnet 84 and the core 104.

Electrical leads 116 extend from opposite ends of the coil 106 to an appropriate pulse counter, register, computer, or other appropriate pulse sensing mechanism (not shown) which may be disposed at an appropriate location, adjacent to or preferably remote from the meter 16. The electrical characteristics of the pulse responsive mechanism (e.g., counter) and the pulse generator are selected and matched to provide a digital response of the pulse sensing mechanism upon each successive rotation of the magnet 84, as described below.

A standard commercial thrust bearing 120 is provided with hardened steel washers to carry the axial thrust load created by magnetic attraction between the pole systems 108 and 110 and the permanent magnet 84. The washers provide a convenient method of controlling the magnetic gap between the stationary and moving systems.

A counter 120 (FIG. 4) may be included in the assembly to provide a visible reading at the meter, both for convenience and for proof-checking at the remote indication. The counter 120 may be operated by direct mechanical input from shaft 22 in a conventional manner, as by a worm gear 122 and spur gear 124, as illustrated.

In operation, the gear 66 is driven by shaft 22 through gear 62 and gear train 64, in direct proportion to the quantity of fluid passing through the meter 16. Assuming an initial position of the various components as shown in FIG. 2, it will be observed that arm 94b abuts the abutment surface 52 to preclude rotation of the magnet rotor assembly 76 in clockwise direction. In this position a south pole area 84S of the permanent magnet is in alignment with core end 108, and a north pole area 84N is in alignment with core end 110 (see FIG. 10b) thereby establishing a magnetic field through core 104 and coil 106 with an imposed north pole at 108 and an imposed south pole at 110, as indicated by the letters N and S in FIG. 10b.

As the meter mechanism rotates, the gear 66 is rotated in a clockwise direction as seen in FIGS. 2, 10a and 11a. Since the inner end of spring 90 is anchored in the magnet rotor assembly 76 which is restrained by trigger 94, and the outer end of the spring is engaged by pin 72 on gear 66, this rotational movement winds the spring 90 and stores mechanical energy therein as gear 66 continues to rotate. Adequate rotation of gear 66 moves trip pin 74 against the inner surface of the arm 94a, and thereby rotates trigger lever 94 in a clockwise direction about boss 88 (see FIG. 10a) until arm 94b disengages from the abutment surface 52. It will be appreciated that at the time of such disengagement, considerable potential energy has been stored in the spring 90 by the movement of the spring end 90b from the position of FIG. 2 to the position of FIG. 10a.

Upon disengagement of arm 94b from abutment surface 52, the torsion force being applied to magnet rotor assembly 76 by the coiled spring 90 (in a clockwise direction as seen in FIGS. 2 and 10a), is adequate to overcome the magnetic attraction between the magnet 84 and the core 104 whereby the magnet rotor assembly is abruptly and rapidly rotated, or snapped, from the position illustrated by FIGS. 10a and 10b, through an arc of rotation of about 180°, to the position illustrated by FIGS. 11a and 11b. Thus, the north pole segment 84N is moved into alignment with core end 108 and the south pole segment 84S is moved into alignment with the pole end 110 (see FIG. 11b).

As the magnet rotor assembly 76 rotates rapidly between the positions of FIGS. 10a and 11a, arm 94a is moved away from trip pin 74. Thereupon, as rotor assembly 76 and the trigger 94 advance, arm 94b overtakes and engages pin 75, which insures positioning of the trigger 94 to extend the distal end of arm 94b to engage abutment surface 50. Pin 102 limits the positioning movement of the trigger. The resulting engagement of the surface 50 by trigger arm 94b precludes further rotation of the magnet rotor assembly 76 until the trigger is again tripped.

With the components in the position indicated in FIGS. 11a and 11b, continued clockwise rotation of drive gear 66 will again impose elastic strain upon spring 90, thereby deforming and storing potential energy in this resilient drive component. When trip pin 74 once more engages arm 94a, the trigger 94 will again be rotated about boss 88 until the distal end of arm 94b clears abutment 50. Thereupon the magnet rotor assembly will again be rotated abruptly and rapidly about 180°, in a clockwise direction as seen in FIGS. 2, 10a and 11a, until arm 94b engages abutment 52 as in FIG. 2. This snap rotation of the magnet rotor assembly from the position of FIG. 11a to that of FIG. 2 again reverses the position of the magnetic poles 84N and 84S relative to the core ends 108 and 110.

It will be appreciated that each described rotation of the magnet rotor assembly abruptly reverses the magnetic field through core 104. The attendant rapid decay of a magnetic field through coil 106 and buildup of a similar field therethrough in an opposite sense constitutes a continuous change in flux in the same direction and by well-known principles operates to generate an electromotive force in the coil of the corresponding polarity. Thereby the coil 106 provides an electrical pulse upon each such rotation, which may be utilized to operate a remote counter or other sensing apparatus, as through leads 116. By the reversal of the magnetic field from a maximum in one sense to a maximum in an opposite sense in generating each pulse, pulses of maximum power are obtained for given magnet field strength and drive conditions. Also, the adverse effects of residual magnetism in the driven system (e.g., a solenoid for operating a counter) are avoided by the succeeding pulses being of opposite polarity.

In a preferred arrangement, the various components are positioned such that the trigger restrained or "stop" positions of the magnet are with the centers of the magnetic polar areas each displaced about 10° from the centers of the respective core ends 108 and 110 in the direction of escape. The drive spring 90 then provides an abrupt, snap-action, rotary drive of magnet 84 through about 180° upon release of the trigger, i.e., 170° of movement to the next polar alignment position to generate the power pulse, with 10° overrun before striking the next abutment stop. It has been found that this arrangement provides a high-power, maximum voltage usable pulse signal, with minimal spurious voltage outputs.

Thus, pulse generating apparatus has been provided which includes axially aligned rotary load-and-fire ballistic trigger components which operate with unidirectional rotary motion of both the driving component 66 and the driven component 76 upon successive loading and escape operations. It will also be noted that the abutment surfaces 50 and 52 as well as the distal end of arm 94b conform to right circular cylindrical surfaces having a center on the axis of pin 98 at the respective stop positions, whereby the distal end of arm 94b moves tangentially of the abutting surfaces during the tripping operation. Accordingly, a positive stop is provided with minimum force being required to disengage the abutting portions to effect the tripping function. While the normal configuration described is preferred, it is also possible to provide a slight cant to the abutting stop surfaces to further decrease the trip release load.

The illustrated mechanism provides a highly efficient magnetic coupling between the magnet rotor and the core of the pulse generating assembly. The described reversal of the magnetic field through the coil insures utilization of substantially all of the available mechanical energy in generating the electrical pulse, and thereby provides a highly satisfactory usable pulse signal with a relatively low power input. Accordingly, the apparatus may be utilized on meters or similar devices having low mechanical power output. This enhances the use of the transducer on inferential type meters as well as on positive displacement meters, with minimum imposed drag or torque load on the metering impeller.

The device is of a very simple design with fixed release and fixed stop locations. This device operates satisfactorily with a single coil assembly and a two-pole magnet. Problems of critical alignment, re-alignment and adjustment relationships between the components in assembly and during operation are avoided. An extremely simple apparatus has been provided with a minimum number of components while providing a high degree of reliability in operation. The various individual components also are of relatively simple construction, and may be inexpensively fabricated. For instance, the casing 78 of the magnet rotor assembly, the trigger lever 94 and the gear 66, as well as the bottom frame 34 and the top frame plate 54, each may be molded of suitable plastic materials such as an acetal.

It will be appreciated that a unique and economical structure has been provided which meets the aforestated objects.

While a particular embodiment of this invention has been shown and described as exemplary of the invention, it will be understood, of course, that the invention is not limited thereto since modifications may be made by those skilled in the art, particularly in light of the foregoing teachings.

What is claimed is:

1. An electromechanical transducer comprising a rotatable component and cooperating means adapted to generate an electrical pulse upon rotation of said component, a rotary drive member rotatable in one direction, and means providing a drive-connection between said rotary member and said rotatable component for rotary advancement of said rotatable component in a first direction in response to rotation of said rotary drive member in said one direction, said means including resilient drive means having an input connection from said rotary drive member and an output connection to said rotatable member, and means for sequentially preventing rotary advancement of said rotatable component in said first direction to cause storage of potential energy in said resilient means during predetermined rotation of said rotary member in said one direction and for thereafter releasing said rotatable component to provide intermittent rotary advancement of said rotatable component in said first direction by said resilient means for generating electrical pulses.

2. An electromechanical transducer as in claim 1 wherein said rotary drive member is axially aligned with said rotatable component.

3. An electromechanical transducer as in claim 2 wherein said resilient drive means comprises a resilient member having one end portion thereof connected to and rotatable with said rotary drive member and an opposite end portion thereof connected to and rotatable with said rotatable component.

4. An electromechanical transducer as in claim 1 wherein said rotary drive member is axially aligned with said rotatable component, and said resilient drive means is disposed between said member and said component and is connected to said rotatable component and to said rotary drive member.

5. An electromechanical transducer as in claim 1 wherein said rotation preventing and releasing means includes fixed abutment means adjacent said rotatable component, a movable member mounted on said rotatable component for engaging said abutment means, and means for disengaging said movable member from said abutment means upon predetermined rotation of said rotary drive member.

6. An electromechanical transducer as in claim 1 wherein said resilient drive means comprises a coil spring.

7. An electromechanical transducer as in claim 1 wherein said rotatable component includes a permanent magnet and said cooperating means comprises a unitary U-shaped core member disposed with its ends adjacent said magnet, and a coil on said core for generating a pulse upon rotation of said magnet.

8. An electromechanical transducer as in claim 1 wherein said cooperating means comprises a core and coil assembly providing two core ends and said rotatable component includes a permanent magnet having two pole faces of opposite polarity disposed for positioning in alignment with said two core ends, said rotation preventing and releasing means providing successive positioning of alternate pole faces of said magnet in alignment with each of said core ends upon successive rotary advancements of said rotatable component.

9. An electromechanical transducer as in claim 1 wherein said rotatable component and said cooperating means include permanent magnet means having an even number of pole faces disposed in a circular pattern with adjacent pole faces being of opposite polarity, and core and coil means having a plurality of core ends disposed in a circular pattern, said pole faces and said core ends being disposed in substantial alignment with one another when said rotatable component is prevented from rotating, and said rotation preventing and releasing means providing advancement of successive pole faces into alignment with successive core ends upon successive rotations of said rotatable component.

10. An electromechanical transducer as in claim 1 wherein said rotatable component includes permanent magnet means having an even number of pole faces disposed in a common plane with adjacent pole faces in said plane being of opposite polarity, said cooperating means including a series of core ends arranged in a common plane parallel to said plane of said pole faces, said rotation preventing and releasing means providing advancement of successive pole faces of said magnet means into alignment with successive core ends upon successive rotations of said rotatable component.

11. An electromechanical transducer comprising first and second rotatable members disposed in axial alignment with one another and each being rotatable about a common axis, resilient drive means connected to said first and second members and permitting rotation of one of said members relative to the other about said axis by elastic strain of said resilient means, stop means for preventing rotation of said second member in one direction to cause storage of potential energy in said resilient drive means upon rotation of said first member in said one direction, and trigger means actuated by rotation of said first member for periodically releasing said second member for rotation by said resilient means, a permanent magnet carried by said second member and having magnetic pole face areas, and core and coil means providing core ends disposed adjacent the path of rotation of said pole face areas for generating an electrical pulse upon rotation of said second member by said resilient means.

12. An electromechanical transducer as in claim 11 wherein said stop means includes fixed abutment means adjacent said second member, a lever pivotally mounted on said second member for engaging said abutment means, and a trip member carried by said first member for disengaging said lever from said abutment means upon predetermined rotation of said first member.

13. An electromechanical transducer comprising a rotatable component and cooperating means adapted to generate an electrical pulse upon rotation of said component, a rotary drive member axially aligned with said rotatable component, and means providing a drive-connection between said rotary member and said rotatable component, said means including resilient drive means having an input connection connected to said rotary drive member and an output connection connected to said rotatable component, and means for preventing rotation of said rotatable component to cause storage of potential energy in said resilient means during predetermined rotation of said rotary member and for thereafter releasing said rotatable component for intermittent rotation in one direction by said resilient means to generate electrical pulses, said rotation preventing and releasing means including abutment means adjacent said rotatable component, stop means mounted on said rotatable component for engaging said abutment means, and trip means carried by said rotary drive member for disengaging said stop means and said abutment means upon predetermined rotation of said rotary drive member.

14. An electromechanical transducer comprising a rotatable component including a permanent magnet and fixed cooperating core and coil means for generating an electrical pulse upon rotation of said magnet component, a rotary drive member rotatable in one direction and axially aligned with said rotatable component, a resilient member disposed between said component and said rotary member, said resilient member being connected to said rotatable component and to said rotary member and providing a resilient drive-connection therebetween, a trigger element mounted on said component, fixed abutment means disposed circumjacent said component, said trigger element being biased toward a position wherein it engages said abutment means to prevent rotation of said component in said one direction, whereby rotation of said rotary member in said one direction imposes elastic strain upon said resilient means for storing potential energy therein, and cam means on said rotary drive member for releasing said trigger element from said abutment means upon predetermined rotation of said drive member to thereby release said component for rotary advancement of said magnet in said one direction by said resilient means to generate an electrical pulse in said coil means.

15. An electromechanical transducer as in claim 14 wherein said resilient member comprises a flat wire spiral torsion spring.

16. An electromechanical transducer as in claim 1 wherein said cooperating means comprises a core and coil assembly including a plurality of core ends disposed in a circle in a common plane and said rotatable component comprises permanent magnet means having a plurality of pole faces disposed in a common plane parallel to and adjacent said common plane of said core ends for operative association with said core ends to generate electrical pulses in said core and coil assembly upon successive rotary advancements of said magnet means.

References Cited
UNITED STATES PATENTS

| | | | |
|---|---|---|---|
| 2,721,478 | 10/1955 | Somerville | 73—194M |
| 2,724,270 | 11/1955 | Trekel | 73—194M |
| 3,118,075 | 1/1964 | Dunn | 310—36 |
| 3,271,599 | 9/1966 | Kohlhagen | 310—37 |
| 3,390,291 | 6/1968 | Eberline | 310—156 |

MILTON O. HIRSHFIELD, Primary Examiner

R. SKUDY, Assistant Examiner

U.S. Cl. X.R.

310—96, 156; 340—359

UNITED STATES PATENT OFFICE
CERTIFICATE OF CORRECTION

Patent No. 3,561,835　　　　　　　　　　Dated February 9, 1971

Inventor(s) Clayton Fyfe

It is certified that error appears in the above-identified patent and that said Letters Patent are hereby corrected as shown below:

Column 3, line 14 "maget" should read -- magnet --.

Column 4, line 53 "48" should read -- 84 --;
line 54 delete parenthesis before "FIG.".

Column 5, line 7 "at" should read -- of --.

Column 8, line 8 delete "a plurality" and insert
-- an even number --.

Signed and sealed this 22nd day of June 1971.

(SEAL)
Attest:

EDWARD M. FLETCHER, JR.　　　　　WILLIAM E. SCHUYLER, JR.
Attesting Officer　　　　　　　　Commissioner of Patents